May 19, 1959 H. P. PACINI 2,887,530

TELEVISION SYNCHRONIZING CIRCUIT

Filed Dec. 2, 1953 2 Sheets-Sheet 1

INVENTOR.
HUMBERT P. PACINI
BY Darby & Darby
ATTORNEYS

TELEVISION SYNCHRONIZING CIRCUIT

Filed Dec. 2, 1953 2 Sheets-Sheet 2

INVENTOR.
HUMBERT P. PACINI
BY Darby & Darby
ATTORNEYS 2,887,530
Patented May 19, 1959

2,887,530

TELEVISION SYNCHRONIZING CIRCUIT

Humbert P. Pacini, Little Falls, N.J., assignor to Allen B. Du Mont Laboratories, Inc., Clifton, N.J., a corporation of Delaware Application December 2, 1953, Serial No. 395,826

1 Claim. (Cl. 178—7.3)

The present invention relates to television receivers and particularly to the synchronizing circuits thereof which function to separate the vertical and horizontal synchronizing pulses from the remaining portions of the video signal.

More particularly still the invention relates to a synchronizing signal separating circuit which will separate the horizontal and vertical synchronizing signals from the video signals, and will produce or reproduce "clean" synchronizing pulses free from noise and other spurious effects and having relatively great amplitude and fast rising leading edges and fast falling trailing edges.

It is an object of the present invention to provide an improved synchronizing signal separator circuit.

It is another object of the invention to produce such a circuit which eliminates or minimizes the adverse effects of noise signals.

It is another object of the invention to provide a separator circuit in which the horizontal and vertical synchronizing signals are individually shaped in a desired manner.

It is a still further object of the invention to provide a circuit having preset clipping levels for the horizontal and vertical synchronizing signals.

Figures 1, 7:
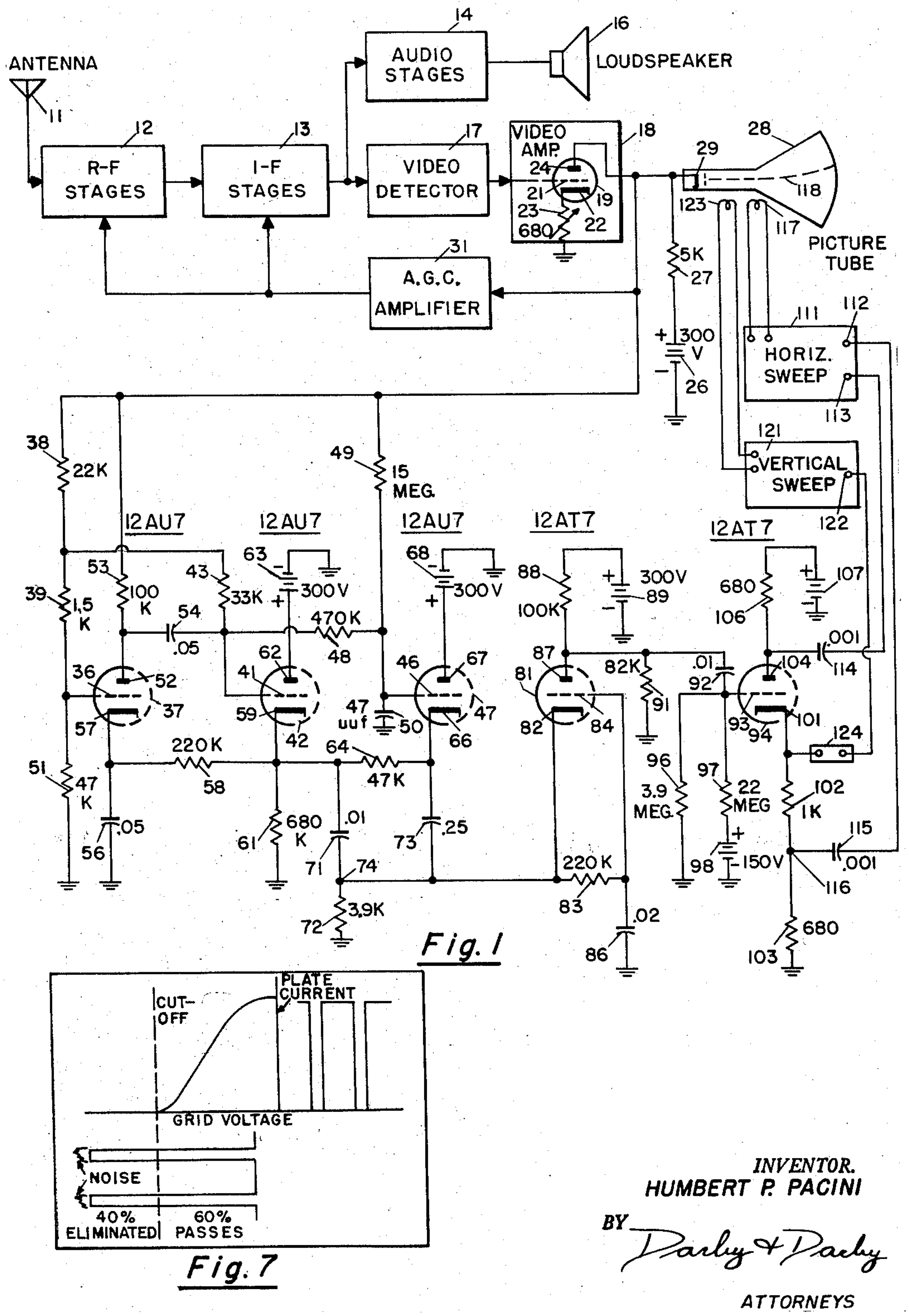

Other objects and features of the invention will be apparent when the following description is considered in connection with the annexed drawings, in which, Figure 1 is a diagram of a television receiver incorporating a preferred embodiment of the invention, the invention being shown schematically and conventional portions of the circuit being shown in block form; and Figures 2–7 are graphical representations of the operation of various portions of the circuit of Figure 1.

Referring now to Figure 1, there is shown at 11 a receiving antenna which is connected to the input of the radio frequency amplifier 12, this amplifier or these amplifier stages including the usual mixer and oscillator. The output of amplifier 12 is connected in the usual manner to the intermediate frequency amplifier 13 which amplifier will be understood to include the usual stages of amplification. The output of the intermediate frequency amplifier is in turn connected through audio stages 14 to a loudspeaker, it being understood that the audio stages include a detector.

Additionally the output of the intermediate frequency amplifier or amplifying stages is connected to a video detector 17, the output of which is connected to video amplifier 18.

Amplifier 18 comprises an amplifier tube 19 having a control electrode, or grid, 21 to which the input signal is applied, a cathode 22 connected to electrical ground through a variable resistance contrast control 23 and an output electrode or anode 24 connected to a source of voltage 26 through a load impedance 27 and also connected to a control electrode or cathode 29 of a television picture tube 28. Automatic gain control circuits 31 are connected between the output of the video amplifier 18 and the radio frequency and intermediate frequency stages 12 and 13 in the conventional manner.

The output electrode 24 of the video amplifier tube 19 is connected to synchronizing signal separator circuits, which constitute the present invention, in the following manner. The output electrode 24 of the video amplifier tube 19 is connected to a control electrode or grid 36 of a noise inverter tube 37 through a direct-current path comprising series-connected resistors 38 and 39, and to the control electrode or grid 41 of a horizontal synchronizing signal clipper tube 42 through a resistor 43 one end of which is connected to the junction of the resistors 38 and 39. The output electrode 24 of the video amplifier tube 19 also is coupled via a D.C. path to the control electrode or grid 46 of a vertical synchronizing signal clipper tube 47, by means of a resistor 48 connected between the grid 46 and the grid 41 of the "horizontal" tube 42; additional direct current coupling is provided by a resistor 49 connected between the grid 46 and the anode 24 of the tube 19. A condenser 50 is connected between the grid 46 and electrical ground.

A resistor 51 is connected between the grid 36 of the noise inverter tube 37 and electrical ground. An anode 52 of the tube 37 is connected through a load resistance 53 to the output electrode 24 of the video amplifier tube 19. A condenser 54 is connected between the anode 52 of the tube 37 and the grid 41 of tube 42. A condenser 56 is connected between a cathode 57 of the tube 37 and electrical ground. A resistor 58 is connected between the cathode 57 and a cathode 59 in the "horizontal" clipper tube 42. A resistor 61 is connected between the cathode 59 and electrical ground. An anode 62 of the horizontal clipper tube 42 is connected to a terminal of a voltage source 63, a remaining terminal of which is connected to electrical ground.

A resistor 64 is connected between the cathode 59 of the horizontal clipper tube 42 and a cathode 66 of the vertical clipper tube 47, an anode 67 of the tube 47 being connected to a terminal of a source of voltage 68, a remaining terminal of which is connected to electrical ground. A condenser 71 and resistor 72 are connected in series, as shown, between the cathode 59 of the horizontal clipping tube 42 and electrical ground, the resistor 72 being at the grounded end of this series combination. A filter condenser 73 is connected between the cathode 66 of the vertical clipping tube 47 and the junction point 74 between the condenser 71 and resistor 72.

A clipper tube 81 is provided with a cathode 82 which is connected to the junction point 74. A resistor 83 is connected between the cathode 82 and a control grid 84 of the tube 81. A condenser 86 is connected between the control grid 84 and electrical ground. An output electrode or anode 87 of the clipper tube 81 is connected through a load resistance 88 to a terminal of a source of voltage 89, the remaining terminal of which is electrically grounded. The output anode 87 of the clipper tube 81 is connected to electrical ground through a resistor 91, and is connected by means of a condenser 92 to a control grid 93 of a phase-splitter tube 94. The grid 93 is connected to electrical ground through a resistor 96 and also is connected through a resistor 97 to a positive terminal of a source of voltage 98, the negative terminal thereof being electrically grounded. A cathode 101 in the phase-splitter tube 94 is connected to electrical ground through series-connected resistances 102 and 103, as shown. An anode 104 of the phase-splitter tube 94 is connected through a load resistance 106 to a terminal of a source of voltage 107, the remaining terminal thereof being electrically grounded.

A horizontal sweep signal generator 111, including an AFC circuit, is provided with push-pull input terminals 112, 113. Coupling condensers 114 and 115 are connected respectively between the anode 104 of tube 94 and the terminal 113, and between the junction point 116 of the resistors 102 and 103 and the terminal 112. Output terminals of the horizontal sweep generator 111 are connected to a horizontal deflection coil 117 which is suitably positioned with respect to the picture tube 28 so as to horizontally deflect an electron beam 118 therein.

A vertical sweep signal deflection circuit 121 is provided with an input terminal 122, and with output terminals which are connected to a vertical deflection coil 123 which is suitably positioned with respect to the picture tube 28 to cause vertical deflection of the electron beam 118. An integrator circuit 124 is connected between the cathode 101 of the phase-splitter tube 94 and the input terminal 122 of the vertical sweep circuit 121.

The novel circuit shown in Figure 1, which constitutes a preferred embodiment of the invention, operates as follows. The composite-video signal, obtained from the output electrode 24 of the video amplifier tube 19, is applied to the control grid 36 of the noise inverter tube 37 and also to the control grids 41, 46 of the horizontal and vertical synchronizing signal clipper tubes 42 and 47. The noise inverter tube 37 is biased so that it is normally cut off. When a noise pulse occurs, the amplitude of which exceeds that of the synchronizing signal, the noise inverter is driven out of cut-off and into a conductive state, and the noise pulse appears at the anode 52.

The noise pulse output of the noise inverter tube 37 is coupled to the grids 41 and 46 of the horizontal and vertical clipper tubes 42 and 47 by means of the coupling condenser 54 and resistor 48. Since a phase reversal occurs in the noise inverter tube 37, the amplified noise pulse from the anode 52 arrives at the clipper tube grids 41 and 46 180° out of phase with respect to the composite video signal at those grids, and the noise pulses become cancelled out, as will be described more fully later on in connection with Figures 2 and 3.

Figure 2:
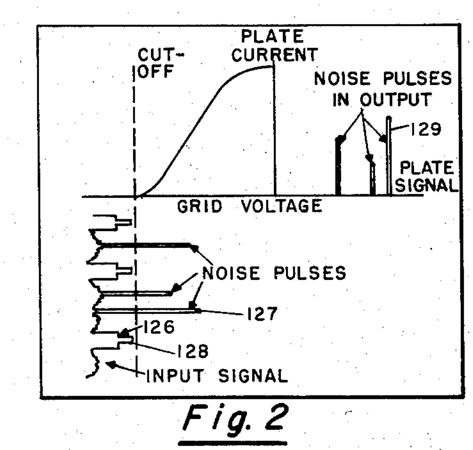

The anode 52 of the noise inverter tube 37 is connected, through load resistor 53, to the anode 24 of the video amplifier tube 19, rather than directly to a voltage source, so that a change of the contrast control 23 will change both the D.C. anode voltage on the tube 37 and the amplitude of the signal fed to the grid 36, thereby maintaining a constant relative level of noise inversion or clipping of noise signals at a point just above the synchronizing tips, as shown in Figure 2. The resistor 39 may be adjusted in value to control the level of noise inversion. In television circuits where the contrast is not controlled by means of a variable cathode resistor 23, it may be desirable to connect a resistor between the anode 52 and the ungrounded end of the voltage source 26, thereby providing a partial effect of changing noise-clipping level to compensate for changes in signal level due to action of the AGC circuits 31.

The horizontal synchronizing signal clipper tube 42, in conjunction with its associated circuits, passes only the horizontal synchronizing signals, and the vertical synchronizing signal clipper tube 47, in conjunction with its associated circuits, passes only the vertical synchronizing signals. The separated horizontal and vertical synchronizing signals are recombined in the circuits connected to the output terminals (at cathodes 59 and 66), and are fed to the input electrode 82 of the synchronizing clipper tube 81. The synchronizing clipper tube 81 is biased so that it clips the signals near the synchronizing signal tips, so as to remove any amplitude modulations which may be present on the top ends of the synchronizing pulses, as will be more fully explained later on.

The output signal from the anode 87 of the clipper tube 81 is fed through the coupling condenser 92 to the grid 93 of the phase-splitter tube 94. This provides, if desired, additional clipping action and, in addition, provides out-of-phase synchronizing signals which are connected through the condensers 114 and 115, to the input terminals 112 and 113 of the horizontal sweep circuits 111 in the well-known manner. The horizontal sweep circuits 111 utilize the horizontal synchronizing pulses to maintain proper horizontal synchronization of the electron beam 118. The synchronizing signals appearing at the cathode 101 of the phase-splitter tube 94 are connected through the integrating circuit 124 to the vertical sweep circuits 121, which circuits utilize the vertical synchronizing pulses to maintain the electron beam 118 in accurate vertical synchronism. The integrator circuit 124 functions to reject the relatively short duration horizontal pulses, and integrates and passes only the relatively longer-duration vertical synchronizing pulses on to the vertical sweep circuits 121.

Referring to the noise inverter tube 37 and associated circuits in greater detail, the composite video and synchronizing signals at the anode 24 of the video amplifier tube 19 are applied to a voltage divider comprising the series-connected resistances 38, 39 and 51. The portion of the signal which appears across the resistor 51 is applied to the grid 36 of the noise inverter tube 37. Since direct current coupling is used between the video amplifier anode 24 and the noise inverter grid 36, part of the video amplifier anode voltage (supplied by the voltage source 26) is applied to the grid 36, making it positive in polarity with respect to electrical ground. A positive potential, obtained from the cathode 59 of the horizontal pulse clipper tube 42, is applied to the cathode 57 of the noise inverter tube 37 through the resistor 58. The resistor 58 and condenser 56 form a bias filter which provides a steady value of cathode bias for the tube 37, and resistor 58 prevents the noise signals from passing into the output (point 74) from cathode 57 of tube 37.

The positive cathode potential, obtained from the cathode biasing resistor 61 and from the voltage charge or condenser 71 due to rectification of signals by the tube 42, is sufficiently greater than the positive grid voltage at the grid 36, to bias the noise inverter tube 37 beyond cut-off and prevent it from conducting on any part of the composite video signal. Therefore, under normal operating conditions with no noise pulses in the signal, there is no signal at the anode 52 of the noise inverter tube 37. This is shown in Figure 2. The desired input signal 126 is beyond the cutoff region of the noise inverter tube 37. When a noise pulse 127 occurs whose amplitude exceeds that of the synchronizing signals 128, it drives the tube into conduction and appears as an output signal 129 at the anode 52, and is coupled to the grids 41, 46 of the clipper tubes 42, 47 by means of the coupling condenser 54.

Figure 3:
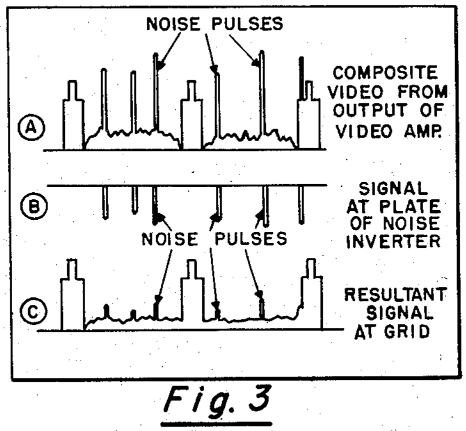

Figure 3 illustrates the signals appearing at the grid 41 of the horizontal synchronizing signal clipper tube 42. A in Figure 3 shows the composite video and synchronizing signals which are connected to the grid 41 through the resistor 43. B in Figure 3 shows the noise pulses which are coupled from the anode 52 of the noise inverter tube 37 to the grid 41, through the condenser 54, the polarity of these noise pulses being opposite the polarity of the noise pulses appearing in Figure 3 A. C in Figure 3 shows the resultant signal at the grid 41, in which the noise pulses are substantially reduced, due to the cancelling effect of signal 3B on the signal 3A. Only a small portion of the noise still remains; and since this portion is below the clipping level of the tubes 42 and 47, none of the noise appears at the output of these tubes at point 74. Sync is only slightly disturbed because of the loss of information during the noise pulses.

Figure 4:
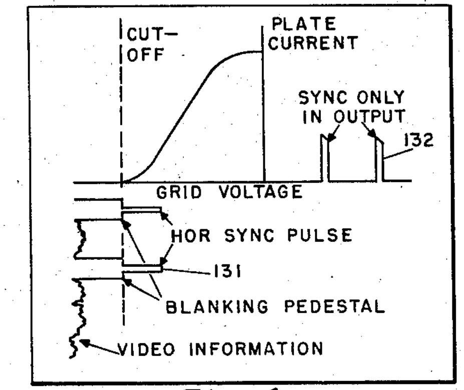

The horizontal synchronizing signal clipper tube 42 and associated circuits function as follows. The grid 41 is positive in polarity with respect to electrical ground, due to the direct current coupling to the voltage source 26. A positive-polarity voltage on the cathode 59, exceeding the positive-polarity voltage on the grid 41, is developed across the resistor 61 and condenser 71, thereby biasing the tube 42 relatively negatively. Figure 4 shows the operating conditions of the tube 42. Due to the biasing, the tube conducts only during the synchronizing pulses 131, resulting in output synchronizing pulses 132.

Figure 5:
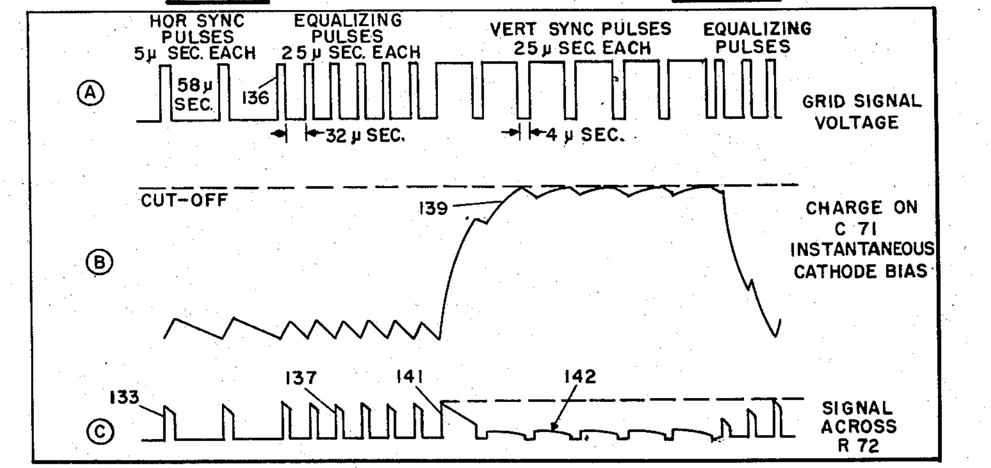

In addition to clipping and shaping the synchronizing pulses 132, the horizontal synchronizing signal clipper tube 42 also substantially removes the vertical synchronizing signals therefrom, as a result of the cathode bias network comprising resistor 61, and condenser 71. Reference to Figure 5, at A, shows that the horizontal and vertical synchronizing pulses are the effective parts of the signal applied to the grid 41 of the clipper tube 42. The horizontal synchronizing pulses have a relatively short duration of 5 microseconds. During each horizontal synchronizing pulse, the tube 42 conducts, as shown in Figure 5C, thereby charging the condenser 71, as shown in Figure 5B. The capacitance of the condenser 71 and the resistance of its discharge path are sufficiently small so that each charge thereon caused by horizontal synchronizing pulses is dissipated before the next horizontal pulse occurs. Hence, the horizontal synchronizing pulses do not appreciably affect the bias on the tube 42, and the tube 42 conducts during each horizontal synchronizing pulse and produces an output current pulse 133 in the resistor 72, as shown in Figure 5C. Since the equalizing pulses are shorter in duration than the horizontal synchronizing pulses, the equalizing pulses 136 produce output signal pulses 137 at the resistor 72.

The vertical synchronizing pulses at the grid 41, however, do not produce a full output signal at the resistor 72, due to the fact that the value of the condenser 71 is so small, and the time constant of its discharge path is so large, that the condenser 71 cannot fully discharge during the relatively short time intervals between the relatively long vertical synchronizing pulses. As a result, the vertical synchronizing pulses develop a relatively large charge 139 on the condenser 71, as shown in Figure 5B. This voltage charge is added to the static cathode bias on the tube 42, causing the cut-off point of the tube to shift so that the tube remains at or near cut-off for the duration of the vertical synchronizing signal. In effect, the tube 42 is turned off during the vertical synchronizing pulses. Therefore, only a portion of the first vertical pulse 141 from the tube 42 appears on the output resistor 72, as shown in Figure 5C, and the remainder 142 of the vertical pulse from the tube 42 does not effectively appear at the output resistor 72.

The horizontal synchronizing signal clipper tube 42 operates as a cathode follower having a cathode biasing resistor 61, the output being taken across the resistor 72 which is coupled to the cathode 59 by means of the condenser 71. As a result of the operating conditions described above, only the horizontal synchronizing signals, the equalizing signals, and a portion of the leading vertical synchronizing pulses, appear across the output resistor 72 due to operation of the tube 42.

If the time constant of the condenser 71 and resistors 61 and 72 were any greater than that necessary for proper operation in connection with the horizontal and equalizing signals, then more noise would undesirably pass through this circuit. This circuit possesses the desideratum of not being appreciably affected, in biasing, by noise pulses. Since the noise pulses are normally of short duration, they do not develop a significant charge in the condenser 71 and, therefore, do not change appreciably the bias on the tube 42. Any effects of noise on the bias will be short-lived due to the short R-C constant. Thus, this circuit is advantageous over the more conventional synchronizing clipper circuits which employ grid leak bias, and in which the bias is determined by the peak amplitude of the signal and resulting in the clipping level being undesirably changed by the presence of noise pulses. The resistor 61 automatically provides a proper amount of average bias for the cathode 57 of the noise inverter tube 37.

As has been pointed out, the vertical synchronizing signals do not pass through the horizontal signal clipping tube 42. Instead, the vertical synchronizing signal is separated from the composite video signal in the vertical synchronizing signal clipper tube 47. The composite video signal is applied to the grid 46 through the resistor 48. As has been described, noise cancellation occurs at the grid 41 of tube 42, before the signals reach the grid 46 of tube 47. Cathode bias for the tube 47 is obtained from the cathode 59 of tube 42, through a filter resistor 64 which, in conjunction with filter condenser 73, prevents the horizontal and equalizing pulses at the cathode 59 from reaching the cathode 66 of tube 47 and provides a steady D.-C. bias at the cathode 66. The filters 64, 73, produce a slightly higher positive voltage at the cathode 66 than at the cathode 42.

Figure 6:
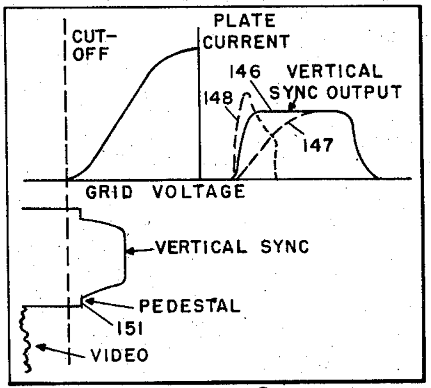

To equalize the bias on the clipper tubes 42 and 47, the resistor 49 is connected as shown, thereby slightly increasing the D.C. voltage at the grid 46 to compensate for the slightly higher cathode voltage on the tube 47. In this manner, the vertical clipper tube 47 is negatively biased beyond cut-off, as shown in Figure 6, so that only the synchronizing signals will cause the tube to conduct current. The resistor 48 and condenser 50 function as a filter having a time constant sufficiently large to prevent the horizontal and equalizing synchronizing pulses from reaching the grid 46. The vertical pulses, however, are sufficiently large in time duration to pass through the filter 48, 50, to the grid 46, whereby the tube 47 becomes conductive and causes the vertical synchronizing signal to appear across the output resistor 72.

The output load resistor 72 is common to the output circuits of both of the tubes 42 and 47; hence, the synchronizing signal outputs of both tubes appear across this resistor. As shown in Figure 6, the leading edge of the vertical synchronizing signal 146 which appears at the load resistor 72, is "squared up" from the shape it would otherwise have, indicated at 147, due to the fast-rising pulse 148 which appears at the resistor 72 from the horizontal clipper tube 42 due to the first portion of the vertical synchronizing signal (141 in Figure 5C) which passes through the tube 42, as has been described.

Each of the synchronizing signal clipper tubes 42 and 47 is provided with circuits having preferred time constants for each of the types of synchronizing signals, viz., the horizontal and vertical synchronizing signals, and each type of synchronizing signal is clipped from the composite signal and then combined at the load resistor 72, without losing the desired shapes of the signals in the clipping process. Also, the clipping levels of the horizontal and vertical synchronizing pulses may be individually preset or adjusted. The value of the cathode bias resistor 61 sets the clipping levels of both clipping tubes 42 and 47; the value of the resistor 49 sets the clipping level of the vertical clipper tube 47. Preferably, the clipping level of the vertical synchronizing signal clipper tube 47 is set at a somewhat lower level than that of the horizontal synchronizing signal clipper tube 42, so as to obtain part of the pedestal 151 in the vertical synchronizing signals, as shown in Figure 6. This improves the vertical synchronizing signal. The pedestal portion is removed in the clipper tube 81.

The combined horizontal and vertical and equalizing synchronizing pulses appearing across the load resistor 72 are connected to the cathode 82 of the synchronizing signal clipper tube 81. The resistor 83 maintains the grid 84 at approximately the same D.C. potential as that of the cathode 82, while the condenser 86 prevents the input signal from appearing at the grid 84.

Figure 7 shows the operating conditions of the clipper tube 81. The tube 81 is biased in such a manner that approximately the upper 40% of the synchronizing signals are clipped off and do not pass through the tube 81, whereas the lower portions of the synchronizing signals pass through the tube 81 and appear at the anode 87 thereof. As shown in Figure 7, any noise or amplitude modulation which is superimposed on the synchronizing signals at the top ends thereof is removed by the clipping action of the tube 81. The novel circuit connections, which provide grid-input and cathode-output for the horizontal and vertical pulse amplifier tubes 42, 47, and cathode-input for the clipper tube 81, in combination with proper bias voltages, causes signal clipping as shown in Figures 2 through 7.

The cathode-input of the clipper tube 81 provides improved pulse shapes, as follows. The cathode 82 of the clipper tube 81 has a relatively low input impedance which varies dynamically with respect to the state of conduction of the tube 81. The input impedance of the cathode 82 is lowest when the tube 81 is in its most highly conductive state, and is highest when the tube is cut off. The output impedances of the horizontal and vertical clipper tubes 42, 47 are relatively low, due to the cathode-follower effect, and hence, approximately match the low input impedance of the clipper tube 81. The dynamic variance of input impedance of the tube 81 aids in the shaping of the synchronizing signals, and causes faster rising leading edges of the synchronizing pulses due to the impedance of the cathode 82 rising during the occurrence of the leading edges, and also causes faster-falling trailing edges of the pulses due to the impedance of the cathode 82 becoming lower during the occurrence of the trailing edges of the pulses.

The synchronizing signals from the anode 87 of the clipper tube 81 are coupled through the condenser 92 to the grid 93 of the phase-splitter tube 94. A small amount of positive-polarity bias is provided at the grid 93 by the voltage source 98 in order to overcome a tendency for the grid 93 to become biased somewhat negatively due to the vertical synchronizing pulses charging the coupling condenser 92. The cathode and anode load resistances 103 and 106 provide a push-pull output signal which is connected to the horizontal sweep circuits 111 in the conventional manner. The vertical integrator circuit 124 couples the vertical synchronizing signals from the cathode 101 to the vertical sweep circuits 121, in the conventional manner.

It will be appreciated that the invention provides a television synchronizing signal separator circuit which provides noise-free synchronizing signals having proper shapes and amplitudes to properly synchronize the horizontal and vertical sweep circuits, thereby insuring accurate synchronization of the electron beam scansion in a television picture tube.

While a preferred embodiment of the invention has been shown and described, various modifications will appear to those skilled in the art which will fall within the scope of invention as defined in the following claim.

What is claimed is:

A television synchronizing circuit comprising a source of repetitive synchronizing pulses having differing predetermined time durations and substantially uniform amplitudes and subject to having undesirable noise pulses superimposed thereon, the amplitudes of said noise pulses being greater than the amplitudes of said synchronizing pulses; a first amplifier stage having input and output terminals and biasing means connected to said first stage whereby the shorter duration ones of said synchronizing pulses are amplified relatively more than the remaining said synchronizing pulses; a second amplifier stage having input and output terminals and biasing means connected to said second stage whereby the longer duration ones of said synchronizing pulses are amplified relatively more than the remaining said synchronizing pulses; a direct current connection between said source of synchronizing pulses and both said input terminals; circuit means including a resistance capacitance coupling network connected jointly to said output terminals to combine the outputs of said first and second amplifier stages; and a noise inverter amplifier stage having a control electrode and an output anode, biasing means connected to said noise inverter stage whereby said noise inverter stage is biased beyond cutoff with respect to said synchronizing pulses and rendered conductive by said noise pulses, a direct current connection between said noise inverter control electrode and said source of synchronizing pulses, and means including a capacitor connecting said output anode to the input terminals of said first and second amplifier stage whereby said undesired noise pulses are substantially cancelled at said first and second amplifier stage inputs.

References Cited in the file of this patent

UNITED STATES PATENTS

| | | |
|---|---|---|
| 2,464,594 | Mahoney | Mar. 15, 1949 |
| 2,540,512 | Crosby | Feb. 6, 1951 |
| 2,601,191 | Wendt | June 17, 1952 |
| 2,652,450 | Tourshou | Sept. 15, 1953 |
| 2,666,815 | Chapin | Jan. 19, 1954 |
| 2,668,234 | Druz | Feb. 2, 1954 |
| 2,718,552 | Anderson | Sept. 20, 1955 |
| 2,736,768 | Tourshou | Feb. 28, 1956 |

FOREIGN PATENTS

| | | |
|---|---|---|
| 504,775 | Belgium | Aug. 14, 1951 |

OTHER REFERENCES

Rider's Television Manual, vol. 7, RCA TV, page 7–62, copyrighted 1951.